United States Patent [19]

Morcom

[11] Patent Number: 4,639,764
[45] Date of Patent: Jan. 27, 1987

[54] MAC VERTICAL SYNCHRONIZING SIGNALS

[75] Inventor: Richard Morcom, Winchester, United Kingdom

[73] Assignee: Independent Broadcasting Authority, London, United Kingdom

[21] Appl. No.: 598,326
[22] PCT Filed: Jul. 29, 1983
[86] PCT No.: PCT/GB83/00186
    § 371 Date: Mar. 23, 1984
    § 102(e) Date: Mar. 23, 1984
[87] PCT Pub. No.: WO84/00657
    PCT Pub. Date: Feb. 16, 1984

[30] Foreign Application Priority Data

Jul. 30, 1982 [GB] United Kingdom ............... 8222055

[51] Int. Cl.$^4$ ............................................... H04N 5/04
[52] U.S. Cl. ........................................ 358/14; 358/12; 358/148; 358/150
[58] Field of Search .................... 358/11, 12, 13, 14, 358/33, 141, 142, 150, 165, 148

[56] References Cited

U.S. PATENT DOCUMENTS 4,245,235 1/1981 Poetsch ................................. 358/14
4,335,393 6/1982 Pearson .............................. 358/12 X

OTHER PUBLICATIONS

*The Radio and Electronic Engineer*, vol. 52, No. 7, Jul. 1982 (London, GB), "F.W.S. Television System for DBS", pp. 311-313.
T. S. Robson, "Extended-Definition Television Service", IEE Proc., vol. 129, Pt. A, No. 7, Sep. 1982, pp. 485-492.
K. Lucas and M. D. Windram, "Direct-Television Broadcasts by Satellite—Desirability of a New Transmission Standard", IBA Report 116/81, pp. 1-19.

*Primary Examiner*—John W. Shepperd
*Attorney, Agent, or Firm*—Watson Cole Grindle & Watson

[57] ABSTRACT

Vertical synchronization information in a multiplexed analogue component (MAC) television signal is included in a line scan period, the amplitudes of the waveform being chosen so as to represent a position in the color space outside that occupied by the picture signal; preferably, the amplitudes are chosen to be at the limits of the picture signal amplitude. By these means, the normal horizontal synchronization information can still be included in the form of transitions 1 and 2, and the chance of the synchronization and picture signals interfering with each other is minimized.

10 Claims, 5 Drawing Figures

MAC VERTICAL SYNCHRONIZING SIGNALS

The present invention relates to the transmission and/or reception of television pictures.

In our co-pending International Patent Application No. PCT/GB83/00022 (Publication No. WO 83/02704) there are disclosed a method and system for transmitting and/or receiving colour television signals which we have called MAC (Multiplexed Analogue Component). In this system, the chrominance and luminance components of the picture are separated and transmitted in time compressed form. Information must be encoded on the compressed signal to provide timing data for horizontal and vertical synchronisation of the received picture.

Unlike convention television coding systems (e.g. PAL) MAC does not have an exclusive voltage level for synchronisation transmission. The chrominance waveform uses the full voltage range of the signal. Thus different methods of synchronisation coding are required.

Horizontal synchronisation information ('linesync') is decoded by detection of the fixed position voltage changes (transitions) at the start and end of the time-compressed luminance information. These transitions remain constant and using 'flywheel' methods can reliably be detected in the presence of other similarly-spaced transitions in the picture information.

However, there is no equally-apparent way to encode vertical or field synchronisation information.

The present invention involves the provision of a vertical synchronisation signal which can be used with separated component signal transmission systems such as the MAC system.

The present invention provides a transmission system for transmitting television signals of the type including separate chrominance and luminance components within individual line periods, the system comprising means for separating the chrominance and luminance components from a picture signal to provide line scan periods having said separated components, characterised in that there are provided means for inserting a vertical synchronisation signal within each field of television signals, said vertical synchronisation signal having a duration of one line period and an amplitude component greater than that of a corresponding component of the separated picture signal.

The present invention also provides a receiving system for receiving signals having a vertical synchronisation signal as abovedescribed.

In order that the present invention may be more readily understood, an embodiment thereof will now be described, by way of example, with reference to the accompanying drawings, in which.

Figure 1:
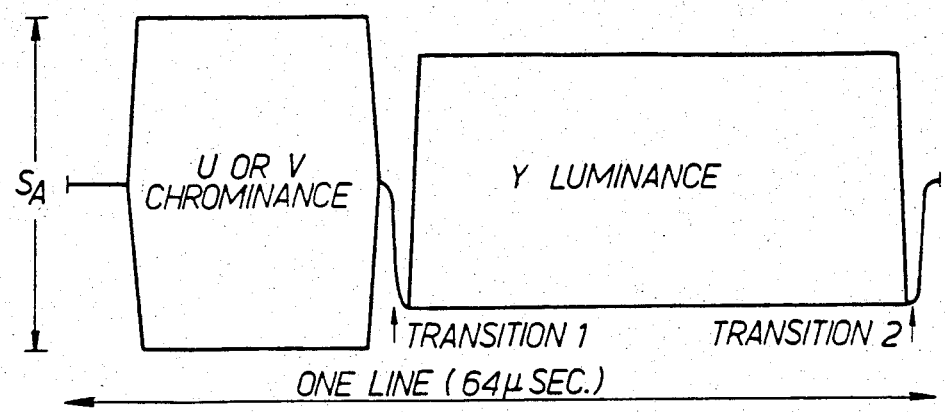
FIG. 1 shows the basic form of a MAC signal.

Referring to FIG. 1, there is shown a representation of a basic MAC signal of one line length (64 μsec) from which it will be seen that the chrominance waveform uses the full voltage range or available signal amplitude $S_A$ of the signal. There is no exclusive voltage level for synchronisation, as previously stated, and therefore other methods must be utilised. Transitions 1 and 2 occurring at the beginning and end of the luminance component can readily be detected to provide horizontal synchronisation information. Further details of the basic MAC signal and its transmission and reception can be obtained from the aforementioned International (PCT) Application.

Figure 2:
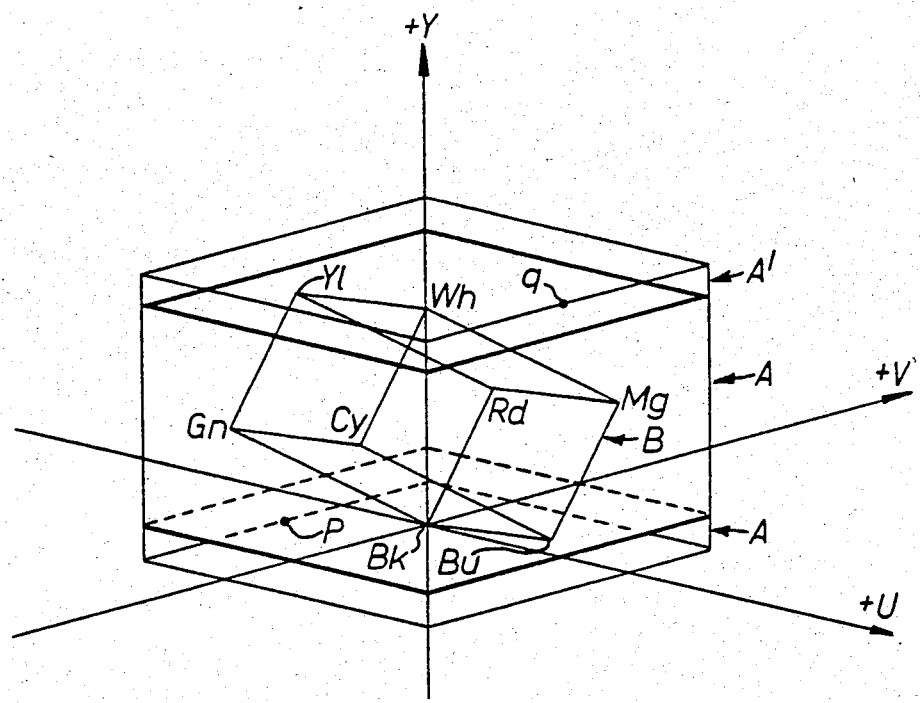
FIG. 2 shows a diagram for use in explaining the present invention.

Due to the nature of the MAC signal, transmission of luminance (Y) and colour difference (U,V) signals is achieved without any interaction between these signals. In addition, there is no restriction on the relative amplitudes for the Y and U or V signals provided they remain within their allotted envelopes. Therefore the limits of the colour signal that may be transmitted by the MAC system can be represented in three dimensions as shown in FIG. 2 by a truncated cube A. Note that the luminance (Y) may be transmitted at a slightly lower level than the two chrominance components (U,V).

The video signal to be encoded by the MAC encoder is produced in R,G,B, (Red, Green, Blue) and then 'matrixed' to Y,U,V by a linear transformation. As the signal is derived from an 'RGB' source, the video signal is constrained to remain in a solid B inside the truncated cube A as shown in FIG. 2. This solid, a 'parallelepiped', is smaller in volume than the truncated cube A. The corners of the parallelepiped B represent the 100% Colour Bar colours, White, Yellow, Green, Cyan, Red, Magenta, Black and Blue, abbreviated to Wh, Yl, Gn, Cy, Rd, Mg, Bk and Bu respectively.

There are many points outside the parallelepiped B yet inside the truncated cube A which could be chosen to encode vertical synchronisation information.

Figure 3:
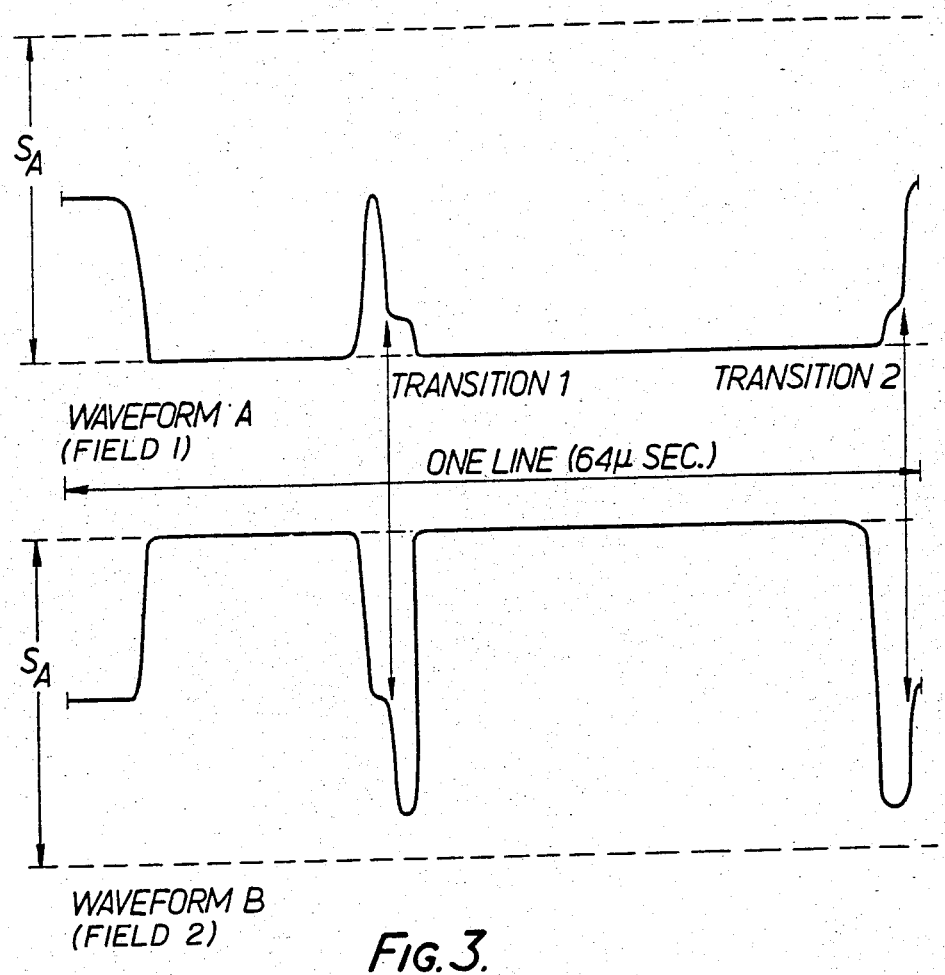
FIG. 3 shows two waveforms provided by apparatus according to the present invention.

As was mentioned earlier, the amplitude of the luminance signal (Y) is reduced compared to the chrominance signals (U,V); this is done so as to restrict bandwidth occupancy in the satellite RF channel. This reduction is only necessary at high baseband frequencies. If only low frequencies were required to be transmitted by the luminance channel, an increase in amplitude could be tolerated. This increase is represented in FIG. 2 by the extension of the truncated cube A to a full cube including portions A'. The bandwidth required for synchronisation is low and hence can be permitted to enter this extra area outside the truncated cube A yet within the full cube. For best resistance to channel noise the optimum positions for synchronisation data are therefore within the full cube but as far as possible from the RGB parallelepiped B. Two such points are marked p and q on FIG. 2. The waveforms A and B corresponding to these points are shown in FIG. 3 and are of this form due to encoding according to the MAC encoding format. Use of such waveforms to encode vertical synchronisation information ensures that picture information can never be erroneously detected as synchronisation information, which is the aim of any synchronisation coding scheme.

Preferably, one of the waveforms shown in FIG. 3 will be used with one of the interlaced fields while the other waveform will be used with the other of the interlaced fields so as to distinguish between the two fields.

Detection of the vertical synchronising waveform described can be achieved by integration of the MAC signal over one line period (64 microseconds). This ensures that the correct level for both Y and U/V signals is obtained. In addition, as horizontal (line) synchronisation information is not required for vertical synchronisation detection, the vertical information may be used to accelerate correct detection of the horizontal synchronisation.

Detection of the synchronisation signals described here can be achieved using simple circuits of the type presently used to detect synchronisation waveforms in the PAL systems.

Figure 4:
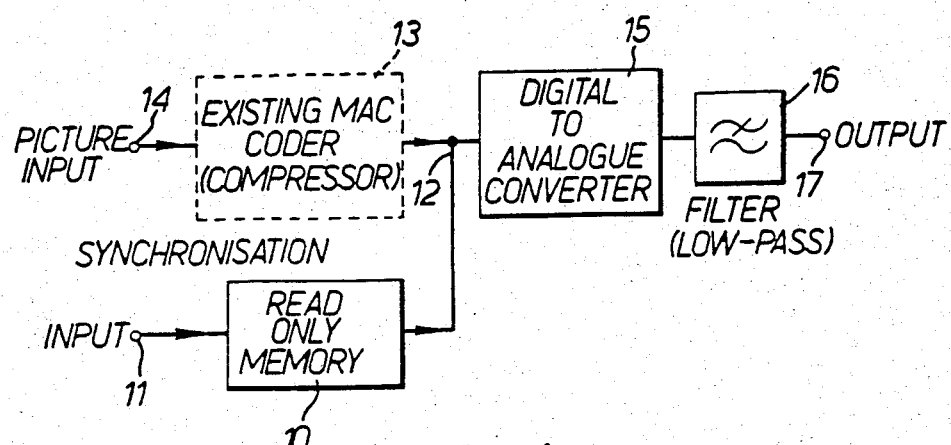
FIG. 4 shows a block diagram of part of transmitting apparatus wherein the synchronisation waveforms of FIG. 3 are inserted in the signal for transmission.

FIG. 4 shows a circuit for inserting the synchronisation signal into the MAC video signal so as to generate the waveform described.

Digital samples corresponding to the levels of the waveform to be produced are stored in a Read-only Memory 10. Readout of data from the memory 10 is controlled by a synchronisation input 11 so as to provide samples which generate the required waveform at the correct time. The waveform, in the form of the digital samples, is then read out on to data bus 12 as an alternative to the compressed picture signal from MAC coder 13 which at other times processes the video signal fed to its picture input 14. The combination of signals is converted to an analogue signal by the digital-to-analogue converter 15 and low-pass filter 16, and the analogue signal present at output 17 is then suitable for transmission.

Figure 5:
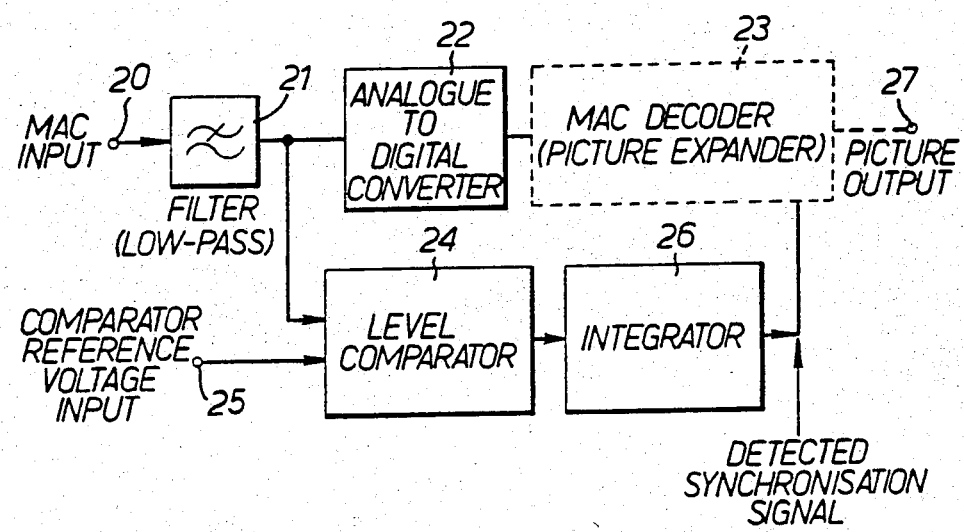
FIG. 5 shows a block diagram of part of receiving apparatus arranged to detect the synchronisation waveforms of FIG. 3.

FIG. 5 shows a circuit for detecting the synchronisation signal within the received signal.

The MAC waveform containing the synchronisation signal is fed to input 20 and thence to low-pass filter 21. The output of the filter 21 goes to an analogue-to-digital converter 22 and MAC picture decoder 23 for decoding the normal picture information. The output of the filter 21 also goes to a level comparator 24 which compares the input signal to a reference voltage at input 25. The reference voltage is set at a level to detect the described synchronisation signal, i.e. its level should be near to the maximum signal amplitude $S_4$. The output of comparator 24 will also contain detections of high level picture information, but these detections are effectively removed by integrator 26 which only provides a detection output in the presence of a synchronisation signal as shown in FIG. 3. The detection output is then used to control the decoder 23 and the vertical synchronisation information allows the decoder 23 to provide a suitable picture signal at output 27.

Thus it will be seen that in the preferred system, vertical synchronisation information is included in a single line scan period per field, which line period can conveniently be provided during the blanking period. The amplitude of the waveform is chosen to lie outside that of the luminance component of the picture signal. By use of such a signal, the normal horizontal synchronisation information can still be included in the form of the transitions normally occurring between chrominance and luminance components, and the chance of the synchronisation and picture signals interfering with each other is minimised.

Advantageous features of this system include:

1. Horizontal synchronisation by use of fixed-position transitions in the waveform within the video signal amplitude range.

2. Accelerated horizontal synchronisation by use of vertical synchronisation information.

3. Use of levels in the MAC waveform representing video signals outside the normal range of picture information to code synchronisation information.

4. Detection of signals in the waveform by mathematical integration.

5. The clamping periods of the basic MAC signal are retained in the sync waveforms.

I claim:

1. A transmission/receiving system for transmitting and receiving television signals of the type including separate chrominance and luminance components within individual line periods of a picture signal, the system comprising transmitting means arranged to transmit within a field of the television signals a vertical sychronisation signal having a duration of one line period and amplitude components representing a position in chrominance/luminance space outside that occupied by the picture signal, and receiving means arranged to receive the television signals including the vertical synchronisation signal and to identify the vertical synchronisation signal through the detection in the received signal of amplitude components representing a position in the chrominance/luminance space outside that occupied by the picture signal.

2. A transmission system for transmitting television signals of the type including separate chrominance and luminance components within individual line periods, the system comprising means for separating the chrominance and luminance components from a picture signal to provide line scan periods having said separated components, means for inserting a vertical synchronisation signal within each field of television signals, said vertical synchronisation signal having a duration of one line period and an amplitude component greater than that of a corresponding component of the separated picture signal, the luminance component of the television signal has an amplitude limit less than that of the chrominance component, the vertical synchronisation signal inserting means generates a signal having a component corresponding to the luminance component but with a greater amplitude, and the amplitude of said vertical synchronisation signal component corresponding to the luminance component has an amplitude equal to that of the amplitude limit of the chrominance component.

3. A transmission system according to claim 2, wherein components of the vertical synchronisation signal have a constant amplitude over substantially the whole of their duration.

4. A transmission system according to claim 2, wherein the timing of the components of the vertical synchronisation signal corresponds to the timing of the components of the picture signal.

5. A transmission system for transmitting television signals of the type including separate chrominance and luminance components within individual line periods, the system comprising means for separating the chrominance and luminance components from a picture signal to provide line scan periods having said separated components, means for inserting a vertical synchronisation signal within each field of television signals, said vertical synchronisation signal having a duration of one line period and an amplitude component greater than that of a corresponding component of the separated picture signal, the picture signal includes transitions between the chrominance and luminance components for horizontal synchronisation information, and said vertical synchronisation signal inserting means provides similar transitions in the vertical synchronisation signal, so as to accelerate horizontal synchronisation.

6. A transmission system according to claim 5, wherein components of the vertical synchronisation signal have a constant amplitude over substantially the whole of their duration.

7. A transmission system according to claim 5, wherein the timing of the components of the vertical synchronisation signal corresponds to the timing of the components of the picture signal.

8. A transmission system for transmitting television signals of the type including separate chrominance and luminance components within individual line periods, the system comprising means for separating the chrominance and luminance components from a picture signal to provide line scan periods having said separated components, means for inserting a vertical synchronisation signal within each field of television signals, said vertical synchronisation signal having a duration of one line period and an amplitude component greater than that of a corresponding component of the separated picture signal, and first and second uniquely identifiable vertical synchronisation signals are provided alternately by said vertical synchronisation signal providing means, thereby to identify alternate interlaced fields of the television signal.

9. A transmission system according to claim 8, wherein components of the vertical synchronisation signal have a constant amplitude over substantially the whole of their duration.

10. A transmission system according to claim 8, wherein the timing of the components of the vertical synchronisation signal corresponds to the timing of the components of the picture signal.

* * * * *